Patented Sept. 5, 1950

2,521,358

UNITED STATES PATENT OFFICE 2,521,358

AZOCHLORAMID ICE

Thomas Galvin, Arcadia, Calif.

No Drawing. Application March 30, 1946,
Serial No. 658,577

6 Claims. (Cl. 99—222)

This invention relates to the control of decay in vegetable or animal matter. In its broadest aspect, it is also useful in the control of infections in living bodies, human or animal, and particularly by the aid of a process and material that are lethal to molds, bacteria, slime, algae, insect eggs, and other forms of life that cause rot or decay or infection.

It is one of the objects of this invention to make it possible more effectively to utilize chemical substances for such controls, and, more particularly, by distribution of the substances in minute form throughout ice.

Ice alone has been extensively used heretofore for preserving animal and vegetable products. It is also applied for treating disabilities, such as sprains, infections, or for open wounds. The curative value of this form of treatment is well recognized.

Ice for such purposes may be applied directly in chunks or crushed, or in pulverized form; or it may be melted in water that may then be applied for preservation of foods or treatment of human beings.

For preservation purposes, ice may be used in still other ways, such as for shipment or for storage. Thus, a crate of vegetables may be covered with a blanket of pulverized or snow ice, which may be renewed as required just before the crates are loaded in refrigerator cars. For storage purposes, a thin film of ice may be used for coating the individual pieces prior to storage in bulk or packages.

It is also common to use "hydro-cooling" for vegetables prior to the application of ice. This process involves passing the vegetables, such as asparagus, carrots, cauliflower, etc., through cool water baths that supply humidity in addition to ice cooling.

Animal foods, such as fish, are also often treated in various ways, such as freezing them within a solid cake of ice or by applying ice in the various ways heretofore stated.

Quick freezing of foods, either animal or vegetable, is often accomplished so as to leave each piece coated with a thin film of ice.

The extensive use of ice in these processes presents frequent problems in connection with the growth of microscopic and macroscopic plant and animal life that are encountered either in the water from which the ice is made, the containers in which the ice is made or placed, or on the products or persons treated. These simple forms of plant or animal life cannot be effectively excluded, for they are present in the air, and in the localities where handling operations occur. They cause rot, decay, and infection.

It is another object of this invention, therefore, to reduce very greatly the danger of intolerable contamination or infection from organic matter encountered in the use of ice.

For this purpose, there is incorporated in the ice a chemical salt that can remain suspended in minute form uniformly distributed in the ice, and that operates to control the growth of undesired organisms. A preferred salt is that which is known as Azochloramid, the chemical name of which is $N$-$N^1$-dichloroazodicarbonamidine. This material has been synthetized by Dr. Schmelkes, and is described in his Patent No. 1,958,370.

Such a chlorine compound has been found remarkably effective as a disinfectant and germicide. By the aid of the present invention, it can likewise be made effective as a harmless preservative of organic matter, either vegetable or animal, and as an improved therapeutic agent.

In order to accomplish these results, an aqueous solution of this chemical is prepared, and which is then diluted with the water used to make ice. The resulting mixture is frozen into a solid cake, or sheet, or thin film, in such manner as to entrap the azochloramid throughout the resulting ice. Since this salt is toxic to both microscopic and macroscopic plant and animal life, and non-toxic to humans, the dispersed minute particles of the salt in the ice used as a preservative, or as a disinfectant, has no harmful effect whatever.

Preferably, the dry azochloramid is used in the proportion of from 5 to 50 milligrams to 300 pounds of water or ice. The degree of concentration is sufficient effectively to overcome the decay and rot problems hereinabove discussed.

The application of the mixture can be accomplished in several ways; e. g.:

(1) By making a solution of desired concentration, spraying it on the product or person to be treated, and then freezing it in such manner as to form a thin film of ice;

(2) By making a solution of desired concentration, and dipping therein, or pouring over, the product or part to be treated, in such manner as thoroughly and intimately to cover them, and then freezing them; or (3) By adding a solution of desired strength to water that is frozen into a solid cake, or sheet of ice, that may then be utilized in divided form (crushed, pulverized, or in chunks) in contact with the products or person to be treated in the various ways that clear ice has been utilized and as hereinabove set forth.

The freezing of the solution is to be accomplished without the addition of any other substance to the solution, and without any mechanical or gaseous agitation.

The resultant frozen solution may be pulverized to form snow, capable of use in packing boxes as a cushion or a cover for the vegetable or animal product that is to be preserved.

It is also possible to use the mixture effectively for preserving, or for disinfecting or treatment of the human body, by spraying the solution onto the object to be treated so as to cover it completely; and then the whole is frozen in any appropriate manner. The spray remains as a thin film of solid frozen material closely adhering and covering the object.

For food packaging, a layer of lumps or sheets of peat moss is often used as a cushion for the product. The solution of azochloramid can be sprayed on this cushion so as to saturate it thoroughly, and then the moss can be frozen to solidify the solution. Similar treatment can be provided for cushioning layers of sawdust, wood pulp, fiber paper, or the like, that may be substituted for the peat moss.

A simple dipping operation in a water bath to which the frozen solution is added in the form of lumps or cakes may also be effective for food products, such as various types of vegetables. If required, agitation may be used to ensure complete immersion. The dipping may be prolonged for as long as necessary for the treatment.

The inventor claims:

1. As an article of manufacture, frozen water in which is dispersed azochloramid in the proportion of from 5 to 50 milligrams of the dry salt to 300 pounds of water.

2. The process which comprises adding azochloramid to water in the proportion of 5 to 50 milligrams of azochloramid to 300 pounds of water; and solidifying the solution by freezing, without addition of any other material to the water.

3. The process which comprises adding azochloramid to water in the proportion of 5 to 50 milligrams of azochloramid to 300 pounds of water; spraying the object to be treated to form a thin film of the solution in intimate contact with the object, and to cover substantially all exposed areas of the object; and freezing the whole in such manner as to solidify the film.

4. The process which comprises adding azochloramid to water in the proportion of 5 to 50 milligrams of azochloramid to 300 pounds of water; dipping the object to be treated in the resulting solution, in such manner as to secure intimate contact and full coverage of the object, and freezing the whole so as to form a solid film of the mixture on the object.

5. The process which comprises adding azochloramid to water in the proportion of 5 to 50 milligrams of azochloramid to 300 pounds of water; thoroughly saturing a mass of moisture retaining packing material (such as peat moss, fibre paper, sawdust, wood pulp) and then freezing said material.

6. The process which comprises adding azochloramid to water in the proportion of 5 to 50 milligrams of azochloramid to 300 pounds of water; and freezing the resulting mixture into one or more solid cakes.

THOMAS GALVIN.

REFERENCES CITED

The following references are of record in the file of this patent:

UNITED STATES PATENTS

| Number | Name | Date |
| --- | --- | --- |
| 1,958,370 | Schmelkes | May 8, 1934 |
| 2,016,257 | Schmelkes | Oct. 1, 1935 |
| 2,203,230 | Nitsche | June 4, 1940 |
| 2,398,781 | Frandsen | Apr. 23, 1946 |